US005255886A

United States Patent [19]

Wang

[11] Patent Number: 5,255,886

[45] Date of Patent: Oct. 26, 1993

[54] ROTATING DEVICE FOR CHRISTMAS TREE

[76] Inventor: Hai C. H. Wang, 14-2, San-Sin Rd., Chao-Chou Chen, Ping-Tong Hsien, Taiwan

[21] Appl. No.: 972,553

[22] Filed: Nov. 6, 1992

[51] Int. Cl.[5] .......... F16M 13/00

[52] U.S. Cl. .......... 248/522; 248/349

[58] Field of Search .......... 248/522, 521, 519, 523, 248/527, 349, 528; 47/40.5

[56] References Cited

U.S. PATENT DOCUMENTS

| | | | |
|---|---|---|---|
| 1,988,343 | 1/1935 | Tacy | 248/522 |
| 2,416,802 | 3/1947 | Roung | 47/40.5 |
| 2,469,884 | 5/1949 | Masone | 248/521 |
| 2,485,460 | 10/1949 | Rocco | 248/522 X |
| 2,527,969 | 10/1950 | Siebenkittel | 248/522 X |
| 2,587,788 | 3/1952 | Tacy | 248/522 |
| 3,042,350 | 7/1962 | Lencioni | 248/522 X |
| 3,652,972 | 3/1972 | Kreider | 248/349 X |
| 5,190,261 | 3/1993 | Tetting | 248/349 X |

FOREIGN PATENT DOCUMENTS

| | | | |
|---|---|---|---|
| 2198632 | 6/1988 | United Kingdom | 248/521 |

*Primary Examiner*—Karen J. Chotkowski
*Attorney, Agent, or Firm*—Bacon & Thomas

[57] ABSTRACT

A rotating device for Christmas tree comprising mainly a shell and a bracket with a reducing motor and a rotating gear within the shell, characterized by the design of a shaft sleeve extended from the center of a side of the rotating gear, a plurality of longitudinal slots on the shaft sleeve for passing through the conductor wires, a flange on the top end of the shaft sleeve and two annular electric conductors fixed on the surface of the rotating gear so that the sleeve can be positioned within a cylindrical post of the bracket, and the annular electric conductors can keep good contact with two conductors on the bracket, and the shaft sleeve can hold a trunk of a Christmas tree so that the Christmas tree can be rotated slowly. It can also include a support with steel balls beneath the rotating gear so that the rotation can be proceeded smoothly.

6 Claims, 4 Drawing Sheets

FIG, 1

ROTATING DEVICE FOR CHRISTMAS TREE

BACKGROUND OF THE INVENTION (a) Field of the Invention

The present invention relates to a rotating device for Christmas tree, particularly a device to serve as a base of Christmas tree and to twinkle bulbs on the Christmas tree.

(b) Description of the Prior Art

Conventionally a freely rotating turntable connected to a power source is used to rotate Christmas tree. Such a design requires some carbon brushes with springs extending outside the turntable to maintain rotating. Since the carbon brushes are simple electric conductors, they can not permit steady rotation of Christmas tree having a considerable weight. Moreover, the use of carbon brushes can maintain steady power supply, aging of the springs would make the carbon brushes unable to maintain good contact with power source.

SUMMARY OF THE INVENTION

The main object of the present invention is to provide a rotating device for Christmas tree which uses a reducing motor to drive a rotating gear with a plurality of matching holes and fixed with two annular electric conductors on its surface to assure steady power supply and help leading of conductor wires for a rotating Christmas tree.

Another object of the present invention is to provide a rotating device for Christmas tree which has a support with a plurality of steel balls beneath the rotating gear to facilitate rotating and to assure steady rotation of a Christmas tree of a considerable weight.

DETAILED DESCRIPTION OF THE PREFERRED EMBODIMENT

Figure 1:
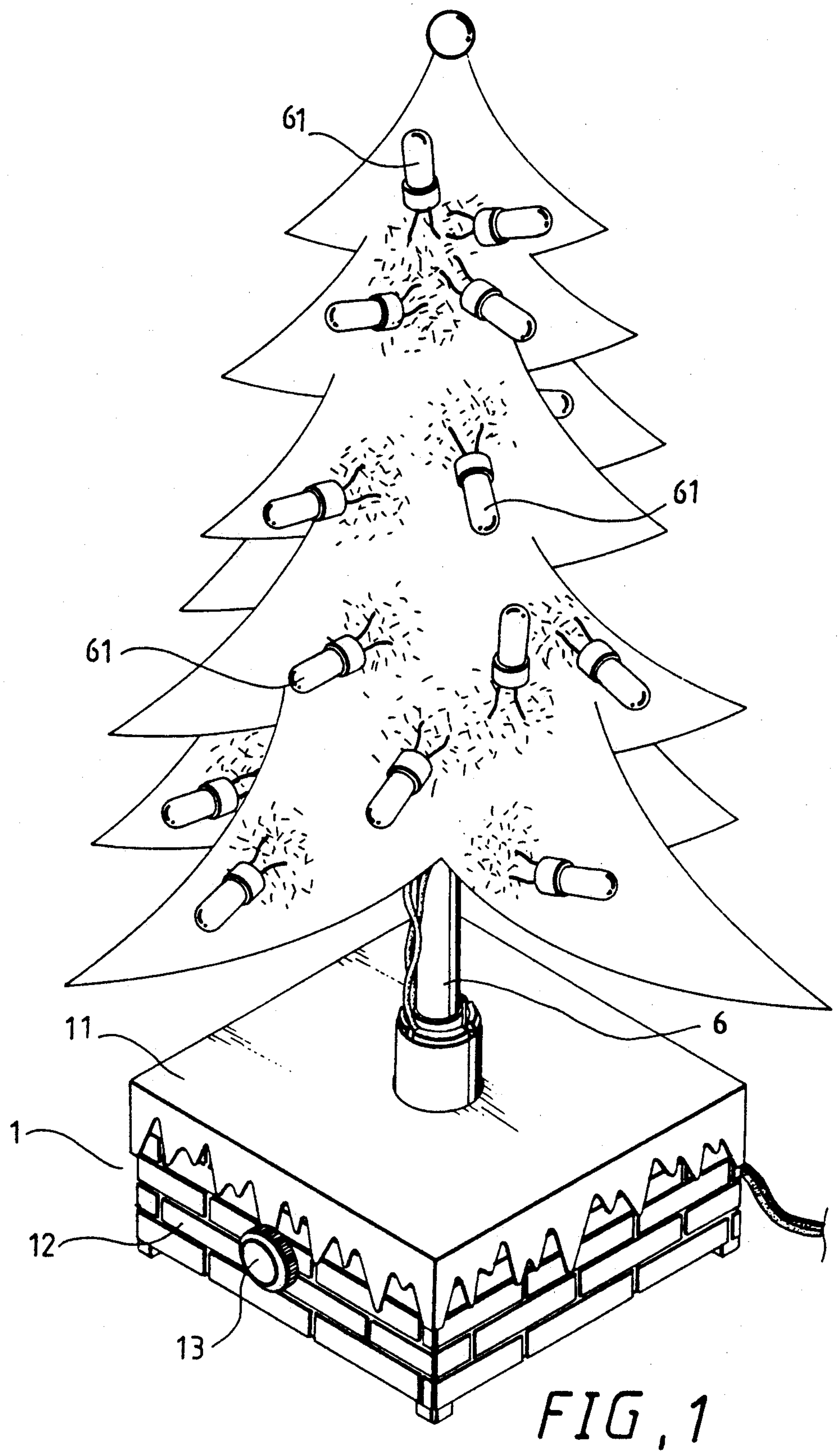
FIG. 1 is a perspective view of a rotating device for Christmas tree according to the present invention.
Figure 2:
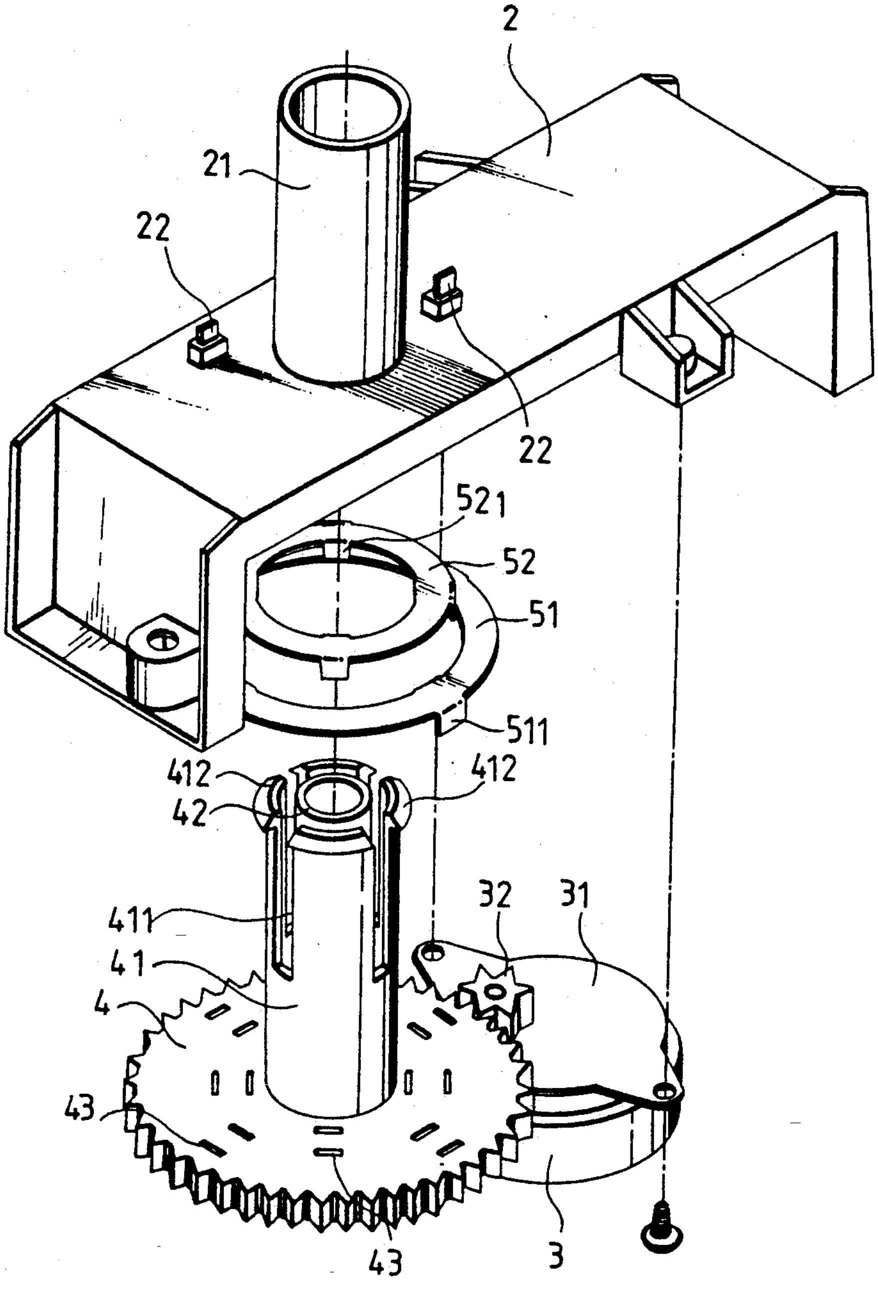
FIG. 2 is a perspective fragmented view of the rotating device according to the present invention.

Please refer to FIGS. 1 through 4, the rotating device for Christmas tree according to the present invention comprises mainly a shell (1), a bracket (2), a reducing motor (3), a rotating gear (4), and two annular electric conductors (51 and 52).

The shell (1) can be in any shape (e.g., sphere, cube or other form) to meet different requirements, and is composed of an upper shell element (11) and a lower shell element (12).

The bracket (2) is a frame with an appropriate configuration to be fixed within the shell (1). A cylindrical post (21) is designed on the bracket (2). two fixed conductors (22) are fixed at opposite sides of the cylindrical post (21).

The reducing motor (3) is secured to the bracket (2) with a fixing plate (31). The reducing motor (3) is incorporated with a driving gear (32) engaging with the rotating gear (4). With its characteristics, the reducing motor (3) can be run steadily and slowly to drive the rotating gear (4).

The rotating gear (4) is made of a non-electric conductive insulating material. It is engaged with the aforesaid driving gear (32), and has an appropriate gear ratio for a suitable rotation speed. The rotating gear (4) has a shaft sleeve (41) with an inner sleeve (42) extended from its center. A plurality of longitudinal slots (411) is formed on the wall of the shaft sleeve (41) from its upper end. The upper end of the shaft sleeve (41) is formed with an appropriate flange (412). On the surface of the gear (4) there is a plurality of matching holes (43) for fixing of two annular electric conductors (51 and 52).

The two annular electric conductors (51 and 52) are of different diameter, but all incorporated with a plurality of fixing elements (511 or 521) for positioning at the matching holes (43) on the rotating gear (4).

For assembly of the above described components, the shaft sleeve (41) of the rotating gear (4) is placed within the cylindrical post (21) of the bracket (2). The flange (412) on the shaft sleeve (41) is then rested on the upper edge of the cylindrical post (21) extending out of the shell (1), and a trunk (6) of a Christmas tree can be inserted to and secured by the inner sleeve (42) in the shaft sleeve (41). The fixed conductors (22) of the bracket (2) is for connecting to a power source cord (7). Each of the annular electric conductors (51 and 52) has a connecting element (511 or 421) at the bottom for connecting to a wire (8) passing through a longitudinal slot (411) to connect to a plug (81) connecting a power source to a series of Christmas lamps as shown in FIG. 3.

Figure 3:
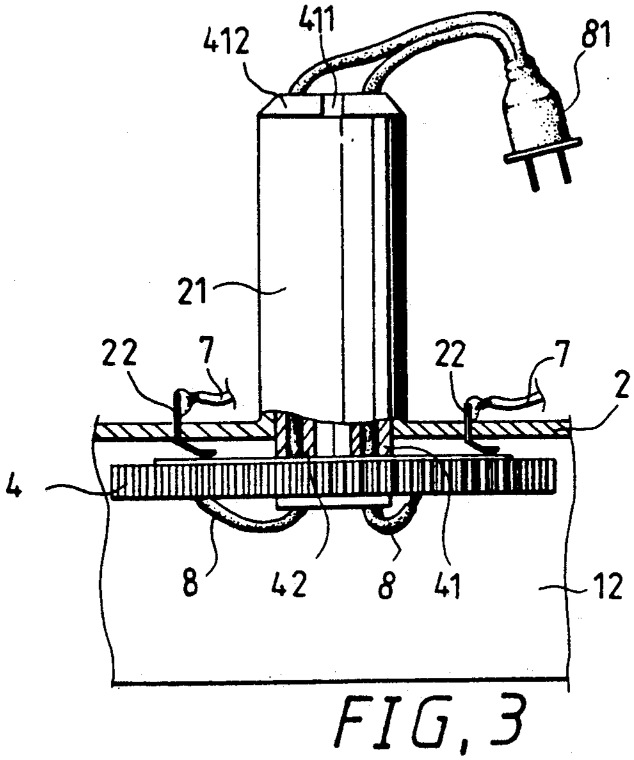
FIG. 3 is a sectional view of the rotating device according to the present invention.
Figure 4:
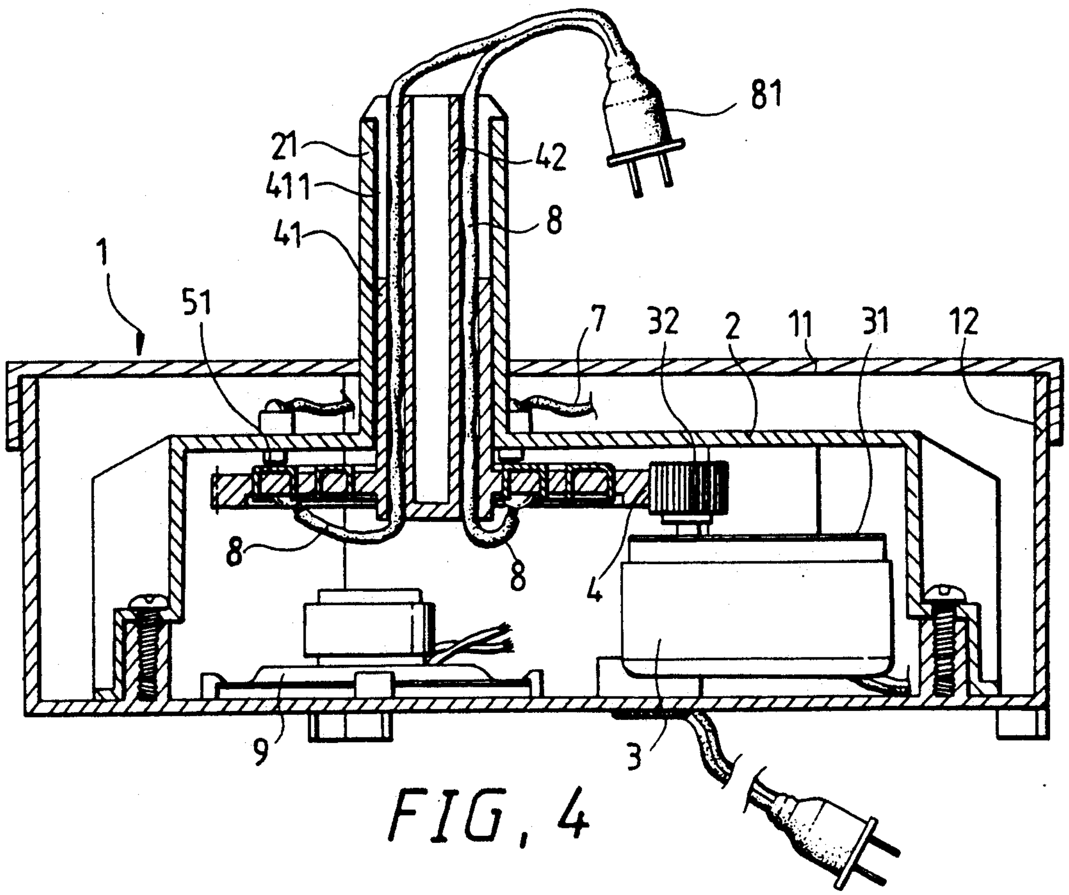
FIG. 4 is a sectional view illustrating assembly of the rotating gear and two fixed conductors on a bracket according to the present invention.

Please refer to FIGS. 3 and 4, each fixed conductor (22) on the bracket (2) has an appropriately bent and elastic end to keep good contact with an annular electric conductors (51 or 52) even during rotation of the present invention.

The present invention may include a speaker (9) to play music at the bracket (2) if required for use on Christmas tree, and a knob (13) on the shell (1) for control of volume. However, the incorporation of such speaker is a conventional skill and it not a feature of the present invention, hence it is not to be described in detail herein.

Figure 5:
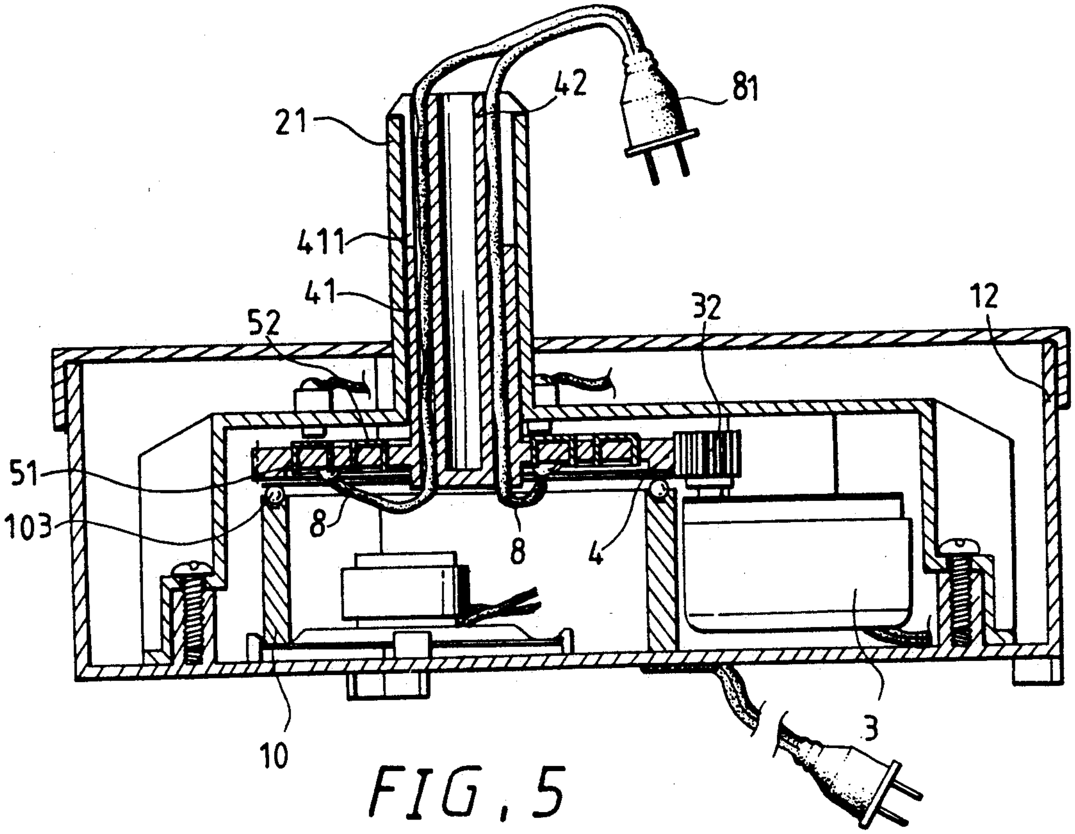
FIG. 5 is a sectional view of another embodiment of the present invention, including a support with a plurality of steel balls.
Figure 6:
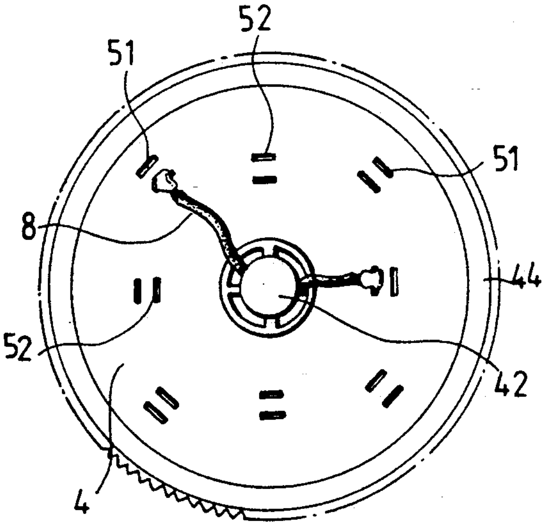
FIG. 6 is a bottom view of the assembly of the rotating gear and the support in FIG. 5.
Figure 7:
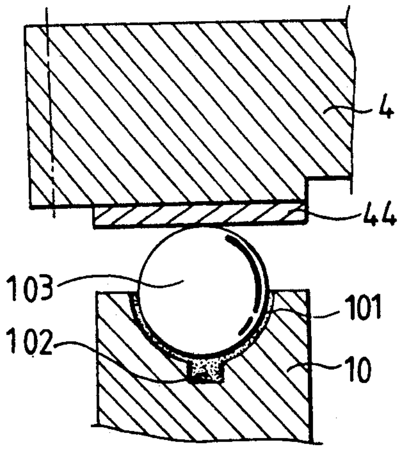
FIG. 7 is a sectional view illustrating assembly of the steel balls in FIG. 5.

Moreover, within the spirit of the present invention, a support (10) can be designed beneath the rotating gear (4), as shown in FIGS. 5 through 7. The support (10) has an appropriate annular groove (101), and the annular groove (101) has a recession (102) for filling of lubricant at the bottom. A plurality of steel balls (103) are placed in the annular groove (101, and an appropriate sliding strip (44), such as a steel or copper strip, is located on the bottom of the rotating gear (4) at a position corresponding to the annular groove (101) to help smooth rotation of the rotating gear (4), and to assure the present invention to maintain a steady rotation with a Christmas tree of considerable weight.

I claim:

1. A rotating device for Christmas tree, comprising mainly a shell composed of an upper shell element and a lower shell element, without any limitation on its shape;

a bracket, secured within the shell, having a cylindrical post, and two fixed conductors on two opposite sides of the cylindrical post for connecting to a power cord;

a reducing motor, secured to the bracket, incorporated with a driving gear engaging with a rotating gear; and a rotating gear, made of non-electric conductive insulating material, having a shaft sleeve extended from a side of its center, an inner sleeve within the shaft sleeve, a plurality of longitudinal slots on the wall of the shaft sleeve, and two annular electric conductors secured to its surface and keeping contact with the fixed conductors on the bracket, and two conductor wires running through the longitudinal slots and connecting to the bottom of the annular electric conductors;

in which the shaft sleeve of the rotating gear is properly positioned within the cylindrical post of the bracket in a manner that the cylindrical post is extended out of the shell, the inner sleeve for fixing of a trunk for a Christmas tree, and the reducing motor, upon connecting to a power source, is to drive the rotating gear so as to rotate the Christmas tree accordingly.

2. A rotating device for Christmas tree as claimed in claim 1 wherein the shaft sleeve of the rotating gear is designed with a flange on its top end for positioning on an end of the cylindrical post of the bracket.

3. A rotating device for Christmas tree as claimed in claim 1 wherein the rotating gear has a plurality of matching holes on its surface, and each of the two annular electric conductors has a fixing element to be secured in a matching hole and a connector element for connecting to a conductor wire by soldering.

4. A rotating device for Christmas tree as claimed in claim 1 wherein the two conductor wires soldered to the annular electric conductors on the rotating gear are led along the longitudinal slots and connected to a plug.

5. A rotating device for Christmas tree as claimed in claim 1 wherein each of the fixed conductor of the bracket has a bent and elastic end to keep close contact with an annular electric conductor.

6. A rotating device for Christmas tree as claimed in claim 1 wherein a support is placed beneath the rotating gear, the support has an appropriate annular groove with a recession for filling of lubricant at the bottom, and a plurality of steel balls are placed in the annular groove, an appropriate sliding strip is located on the bottom of the rotating gear at a position corresponding to the annular groove to help smooth rotation of the rotating gear.

* * * * *